US011488054B2

United States Patent
Bonawitz (10) Patent No.: US 11,488,054 B2
(45) Date of Patent: Nov. 1, 2022

(54) SYSTEMS AND METHODS FOR DISTRIBUTED ON-DEVICE LEARNING WITH DATA-CORRELATED AVAILABILITY

(71) Applicant: Google LLC, Mountain View, CA (US)

(72) Inventor: Keith Bonawitz, Watchung, NJ (US)

(73) Assignee: GOOGLE LLC, Mountain View, CA (US)

( * ) Notice: Subject to any disclaimer, the term of this patent is extended or adjusted under 35 U.S.C. 154(b) by 1106 days.

(21) Appl. No.: 15/834,001

(22) Filed: Dec. 6, 2017

(65) Prior Publication Data

US 2019/0171978 A1 Jun. 6, 2019

(51) Int. Cl.
*G06N 20/00* (2019.01)
*G06F 16/95* (2019.01)
*G06N 20/20* (2019.01)

(52) U.S. Cl.
CPC ............. *G06N 20/00* (2019.01); *G06F 16/95* (2019.01); *G06N 20/20* (2019.01)

(58) Field of Classification Search
CPC ......... G06N 20/00; G06N 20/20; G06F 16/95
See application file for complete search history.

(56) References Cited

U.S. PATENT DOCUMENTS

| | | | | |
|---|---|---|---|---|
| 9,195,906 | B2 * | 11/2015 | Zhang | G06K 9/469 |
| 2018/0046902 | A1 * | 2/2018 | Liao | G06N 3/0454 |
| 2018/0115598 | A1 * | 4/2018 | Shariat | G06F 9/46 |

FOREIGN PATENT DOCUMENTS

| | | | | |
|---|---|---|---|---|
| JP | WO2017145852 A1 | * | 12/2018 | ............... G06N 3/08 |
| WO | WO2017/066509 | | 4/2017 | |
| WO | WO-2018015080 A1 | * | 1/2018 | ........... G06K 9/4628 |
| WO | WO-2018033890 A1 | * | 2/2018 | ............. G06N 3/084 |

OTHER PUBLICATIONS

International Search Report and Written Opinion for PCT/US2018/050451, dated Nov. 25, 2018, 13 pages.

* cited by examiner

*Primary Examiner* — Lut Wong (74) *Attorney, Agent, or Firm* — Dority & Manning, P.A.

(57) ABSTRACT

The present disclosure provides systems and methods for distributed training of machine learning models. In one example, a computer-implemented method is provided for training machine-learned models. The method includes obtaining, by one or more computing devices, a plurality of regions based at least in part on temporal availability of user devices; selecting a plurality of available user devices within a region; and providing a current version of a machine-learned model associated with the region to the plurality of selected user devices within the region. The method includes obtaining, from the plurality of selected user devices, updated machine-learned model data generated by the plurality of selected user devices through training of the current version of the machine-learned model associated with the region using data local to each of the plurality of selected user devices and generating an updated machine-learned model associated with the region based on the updated machine-learned model data.

22 Claims, 4 Drawing Sheets

SYSTEMS AND METHODS FOR DISTRIBUTED ON-DEVICE LEARNING WITH DATA-CORRELATED AVAILABILITY

FIELD

The present disclosure relates generally to machine learning. More particularly, the present disclosure relates to distributed training of machine learning models.

BACKGROUND

Federated learning systems train a machine learning model based on data generated from large numbers of users interacting with their devices (e.g. smart phones, etc.), without requiring the data to be taken off of the device. For example, every cycle a subset (e.g., 1000, etc.) of the devices that are online are selected and a current version of the machine learning model is sent to those selected devices. Each of those selected devices is tasked with using their own locally-generated and locally-stored data to compute an update to the model. The model updates are then sent back to the server, averaged, and applied to the server's model in order to produce a new version of the model for the next iteration of users (e.g., a next subset of devices).

Under some assumptions, a federated learning procedure learns an equivalently-performing model as would be learned if all the data and training happened centrally in the data center. One of those assumptions is that the set of clients available for each iteration of federated learning have a representative sample of the full data set. However, this is often far from true. For example, consider training a model of natural language using federated learning. Generally, devices are significantly more likely to be available during the nighttime in the user's local time zone, time zones are highly correlated with geocultural boundaries, and geocultural boundaries are highly correlated with natural language use (e.g., native/primary language). As a result, the relative proportions of training data (e.g. American English vs. Mandarin vs. Hindi vs. French etc.) available vary over the daily cycle, posing a challenge for federated learning.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for training machine-learned models. The method can include generating, by one or more computing devices, a plurality of regions based at least in part on temporal availability of user devices. The method can further include selecting, by the one or more computing devices, a plurality of available user devices within a region. The method can further include providing, by the one or more computing devices, a current version of a machine-learned model associated with the region to the plurality of selected user devices within the region. The method can further include obtaining, by the one or more computing devices from the plurality of selected user devices, updated machine-learned model data generated by the plurality of selected user devices through training of the current version of the machine-learned model associated with the region using data local to each of the plurality of selected user devices. The method can further include generating, by the one or more computing devices, an updated machine-learned model associated with the region based on the updated machine-learned model data.

Another example aspect of the present disclosure is directed to a computing device. The computing device includes one or more processors; and one or more non-transitory computer-readable media that store instructions. The instructions, when executed by the one or more processors, cause the computing device to generate a plurality of regions based at least in part on temporal availability of user devices. The instructions, when executed by the one or more processors, further cause the computing device to select a plurality of available user devices within a region. The instructions, when executed by the one or more processors, further cause the computing device to provide a current version of a machine-learned model associated with the region to the plurality of selected user devices within the region, wherein each of the plurality of selected user devices performs training of the current version of the machine-learned model associated with the region using data local to each of the plurality of selected user devices. The instructions, when executed by the one or more processors, further cause the computing device to obtain, from the plurality of selected user devices, updated machine-learned model data. The instructions, when executed by the one or more processors, further cause the computing device to generate an updated machine-learned model associated with the region based on the updated machine-learned model data.

Another example aspect of the present disclosure is directed to a system, the system including a server and a plurality of user devices. The server includes one or more processors; and one or more non-transitory computer-readable media that store instructions that, when executed by the one or more processors, cause the one or more processors to perform operations. The operations include generating a plurality of regions based at least in part on temporal availability of user devices. The operations further include selecting, from the plurality of user devices, a plurality of available user devices within a region. The operations further include providing a current version of a machine-learned model associated with the region to the plurality of selected user devices within the region. The operations further include obtaining, from the plurality of selected user devices, updated machine-learned model data. The operations further include generating an updated machine-learned model associated with the region based on the updated machine-learned model data. Each of the plurality of user devices includes one or more processors; and one or more non-transitory computer-readable media that store instructions that, when executed by the one or more processors, cause the one or more processors to perform operations. The operations include performing, in response to being selected from the plurality of user devices as an available user device within the region and receiving the current version of a machine-learned model associated with the region, training of the current version of the machine-learned model associated with the region using data local to the user device. The operations further include providing, to the server, updated machine-learned model data generated through the training of the current version of the machine-learned model.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Reference numerals that are repeated across plural figures are intended to identify the same features in various implementations.

DETAILED DESCRIPTION

Overview

Generally, the present disclosure is directed to systems and methods for distributed training of machine learning models. In particular, the systems and methods of the present disclosure can subdivide the world into regions (e.g., spatial regions and/or the like) and leverage these regions to improve data availability for training of machine learning models. According to an aspect of the present disclosure, the regions can include regions in which the respective devices located in each region exhibit similar temporal availability patterns. By using these regions, the data held by a subset of users selected in a region for an iteration of training a machine learning model can be a more consistently representative sample of all users in the region, thereby improving the training of a machine learning model. In particular, once the regions have been generated, a copy of a machine learning model to be trained can be associated with each region, and each copy of the machine learning model can be trained using federated learning based on users within that region. Multitask learning techniques can then be used, for example to bias a model learned in one region to be more like one or more models learned in other regions, such that the copy of the model for each region can benefit from model data generated in other regions.

Thus, the present disclosure provides techniques for distributed training of machine learning models where training data is correlated by regional availability. The techniques can allow for combining data in regional models and models where regionality is a benefit (e.g., natural language processing). For example, aspects of the present disclosure may be used to improve any type of model where user interactions can differ based on location (e.g., prediction of next application to be opened) as building one model across all populations can generally tend to provide superior results. For example, region specific models can be generated and trained; however, regional models may lose out on a significant amount of training data (e.g., data from the user population outside the specific region) that may benefit the model. For instance, if model interactions across the world are not identical but are related, discarding all of this additional available data (e.g., users outside the region) for training the model may reduce the effectiveness of the model.

In particular, the systems and methods of the present disclosure can improve the training of machine learning models when training is embedded into physical devices (e.g., smart phones, server, etc.) which have different physical properties (e.g., availability), different physical constraints (e.g., bandwidth), and different privacy requirements (e.g., user data stays local to each user's own device). Tailoring to account for ways in which real devices do not meet the requirements of standard federated learning can improve the ability to produce a model that serves all users well, regardless of what region the users are in.

More particularly, according to an example aspect of the present disclosure, the world can be subdivided into a plurality of spatial regions such that there is some measure of diurnal cycle uniformity for each of the regions in addition to a large enough user population for each of the regions to provide data availability for training machine learning models. For example, the world can be subdivided such that each region is large enough to ensure that enough devices (e.g., thousands of devices) can be consistently found online for a period of at least several hours each day and each region is small enough and is determined such that a typical diurnal cycle for users in the region does not vary much within the region. In some implementations, for example, the world can be subdivided into a plurality of regions based on latitude and/or longitude, based on time zones, based on semantic boundaries (e.g., country borders, regional borders, etc.) and/or the like. In some implementations, the regions can be generated such that there is similar (e.g., approximately even) user population per region.

As one example, in some implementations, the world may be subdivided into a plurality of longitude ranges (e.g., 12 longitude ranges, 24 longitude ranges, etc.) such that each region is several hours (e.g. 1 to 2 hours, etc.) wide. In some implementations, the range boundaries could also be adjusted based on geocultural borders (e.g., using the intersection of longitude bands with country borders) or allow narrow regions of population outside a predefined longitude range to be added to be included in an adjacent range rather than standing alone (e.g., as happens with time zones), or based on problem-specific regions of likely-similar users.

As another example, in some implementations, instead of dividing the world into spatial regions, we could instead first cluster users into groups with similar diurnal data availability patterns (e.g., users whose devices are typically available between 1:00 and 9:00 UTC, users whose devices are typically available between 2:00 and 10:00 UTC, etc.). In some implementations, devices are "available" as used herein only when certain constraints are met. For example, in some implementations, a device can be available only when it is plugged into a source of utility power (e.g., a wall socket rather than relying solely on battery power), is connected to a non-metered network access point (e.g., connected to WiFi and not cellular data), and is not otherwise in use by the user.

According to another aspect of the present disclosure, once the regions are determined, a copy of a machine learning model can be associated with each region. The copy of the machine learned model for a region can then be trained based on users within that region using federated learning techniques. Federated learning systems train a machine learning model based on data generated from large numbers of users interacting with their devices, without requiring the data to be taken off of the device. For example, each of the devices selected for a training iteration can be tasked with using the locally-generated and locally-stored data on the device to compute an update to the machine learning model. Due to the diurnal-uniformity of the regions, the data held by a sampled subset of the users for each region can generally provide a more consistently representative sample of all the users in the region.

In some implementations, one or more servers (e.g., cloud servers, etc.) can maintain and have access to the machine learning models associated with each region. In some implementations, the one or more servers can use multitask learning techniques to bias the model learned in one region to be more like the models being learned other regions. By combining information across regions, each region's model can be allowed to benefit from the model data generated in all the other regions. For example, in the extreme case where most regions actually do have similar data, and in which there are, say, 24 regions, then this means that there is effectively 24× more training available than if separate models are trained on the data from each region individually, and more training data can generally lead directly to better model performance.

More particularly, in some implementations, a model for a first region (e.g., region A) can be trained on data from users located in region A, but can be constrained not to deviate too much from other regions (e.g., a region B that is related to region A in some way) and/or from a global model. For example, a server could add a term to the loss function for an iteration of federated learning in region A wherein the loss is increased based on the sum of the distances of region A's model from each other region's model, measured in parameter space. This would represent a regularization term that could be sent to each user (e.g., user device) in region A, and which that user device could incorporate when computing its own update to the model. In some implementations, a regularization term can be weighted, such as, for example, similar language time zones (e.g., the respective models for the time zones including Sydney, Australia and London, United Kingdom) could be weighted greater, adjacent time zones could be weighted greater, and/or the like. The regularization term can be computed at the server and sent to the user devices or can be computed at the user devices.

In some implementations, user devices can compute which direction to move the parameters to minimize the training data term of loss function. The server could compute which direction to move the parameters to minimize the regularization term of the loss function. The user devices can add the gradients together. Alternatively, the server device can add the gradients together. In some implementations, the learning iterations can alternate between regularization term and training data term minimization.

In some implementations, one or more parameters can be controlled during training, such as drawing samples from user data some number of times, the number of samples drawn each time, doing multiple training iterations prior to upload and regularization, and/or the like.

In some implementations, instead of precomputing a gradient of the regularization term, the server could compute the centroid of one or more other models. For example, the server could compute the direction, in parameter space, from region A's current model to the model that would minimize the regularization term (e.g., the centroid of the other regions' models, in parameter space). The server could send to region A's users either the centroid itself or the direction to the centroid, which is likely smaller than the loss term with components representing each other region's model. In some implementations, this can allow user devices to perform multiple training iterations without needing an updated regularization term gradient from the server.

In some implementations, the server could alternate between running federated learning across the users without a bias term, then running a step of stochastic gradient descent on the server side using just the regularization term (i.e., moving region A's model a bit towards the other regions' centroid before sending this adjusted model out to the next set of users for a federated learning iteration).

With reference now to the Figures, example embodiments of the present disclosure will be discussed in further detail.

Example Devices and Systems

Figure 1A:
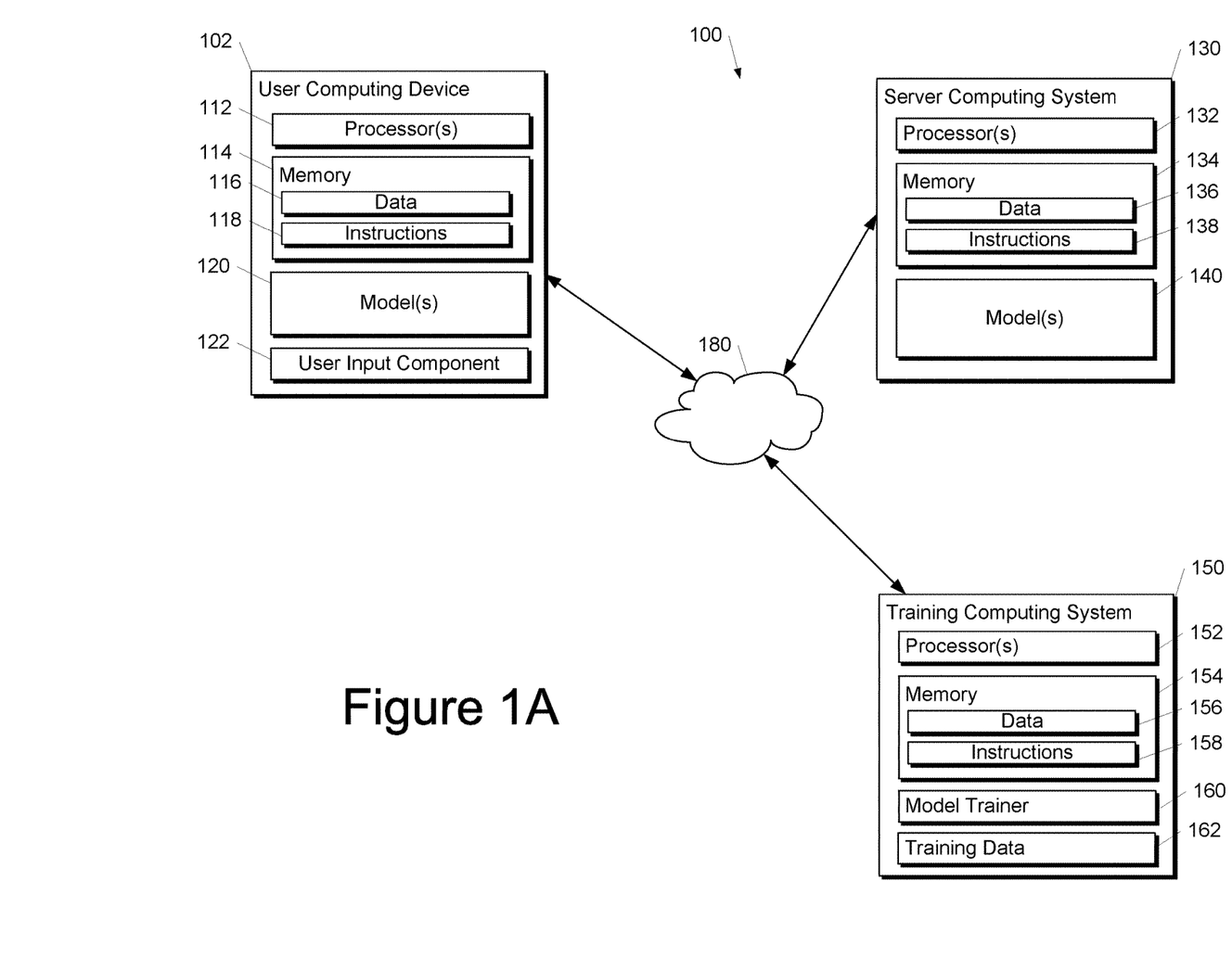
FIG. 1A depicts a block diagram of an example computing system that performs distributed on-device machine learning model training according to example embodiments of the present disclosure.

FIG. 1A depicts a block diagram of an example computing system 100 that can perform distributed machine learning model training according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more models 120. For example, the models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more models 120 can be received from the server computing system 130 over network 180, stored in the user computing device memory 114, and then used or otherwise implemented by the one or more processors 112. In some implementations, the user computing device 102 can implement multiple parallel instances of a single model 120.

Additionally or alternatively, one or more models 140 can be included in or otherwise stored and implemented by the server computing system 130 that communicates with the user computing device 102 according to a client-server relationship. For example, the models 140 can be implemented by the server computing system 140 as a portion of a web service. Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks.

The user computing device 102 and/or the server computing system 130 can train the models 120 and/or 140 via interaction with the training computing system 150 that is communicatively coupled over the network 180. The training computing system 150 can be separate from the server computing system 130 and/or the user computing device 102 or can be a portion of the server computing system 130 and/or the user computing device 102.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained. In particular, the model trainer 160 can train the models 120 and/or 140 based on a set of training data 162.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory, and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
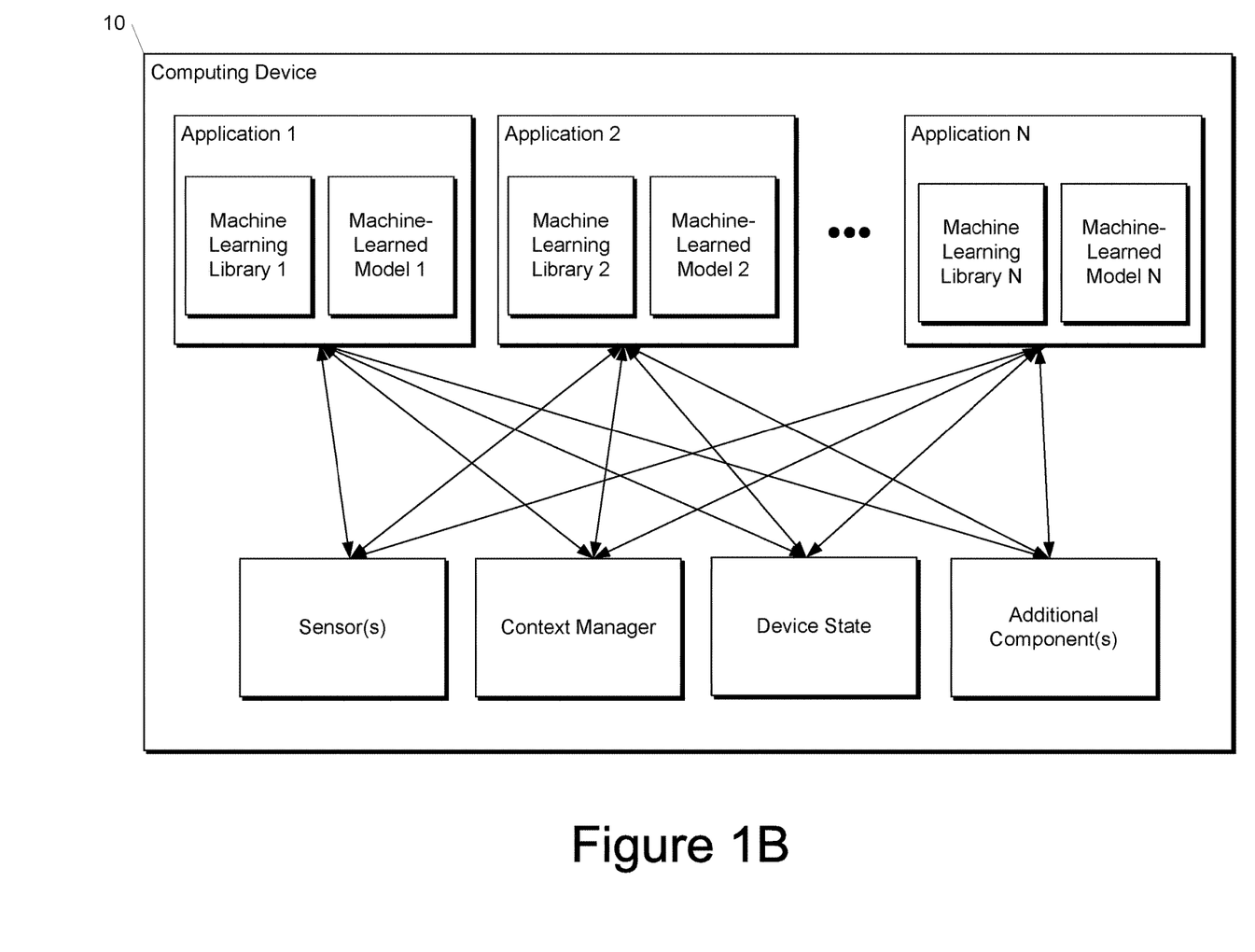
FIG. 1B depicts a block diagram of an example computing device that performs distributed on-device machine learning model training according to example embodiments of the present disclosure.

FIG. 1B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
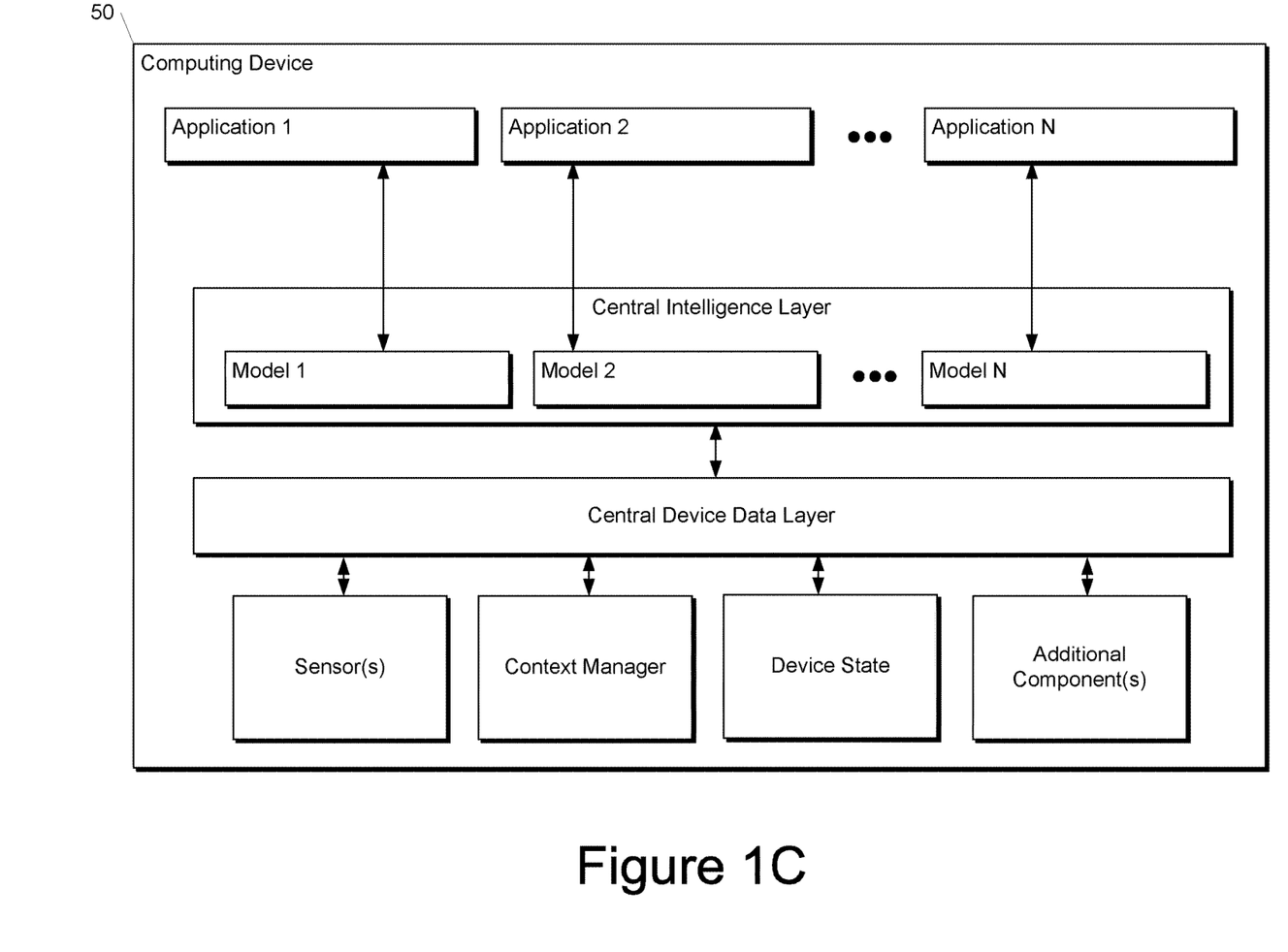
FIG. 1C depicts a block diagram of an example computing device that performs distributed on-device machine learning model training according to example embodiments of the present disclosure.

FIG. 1C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Methods

Figure 2:
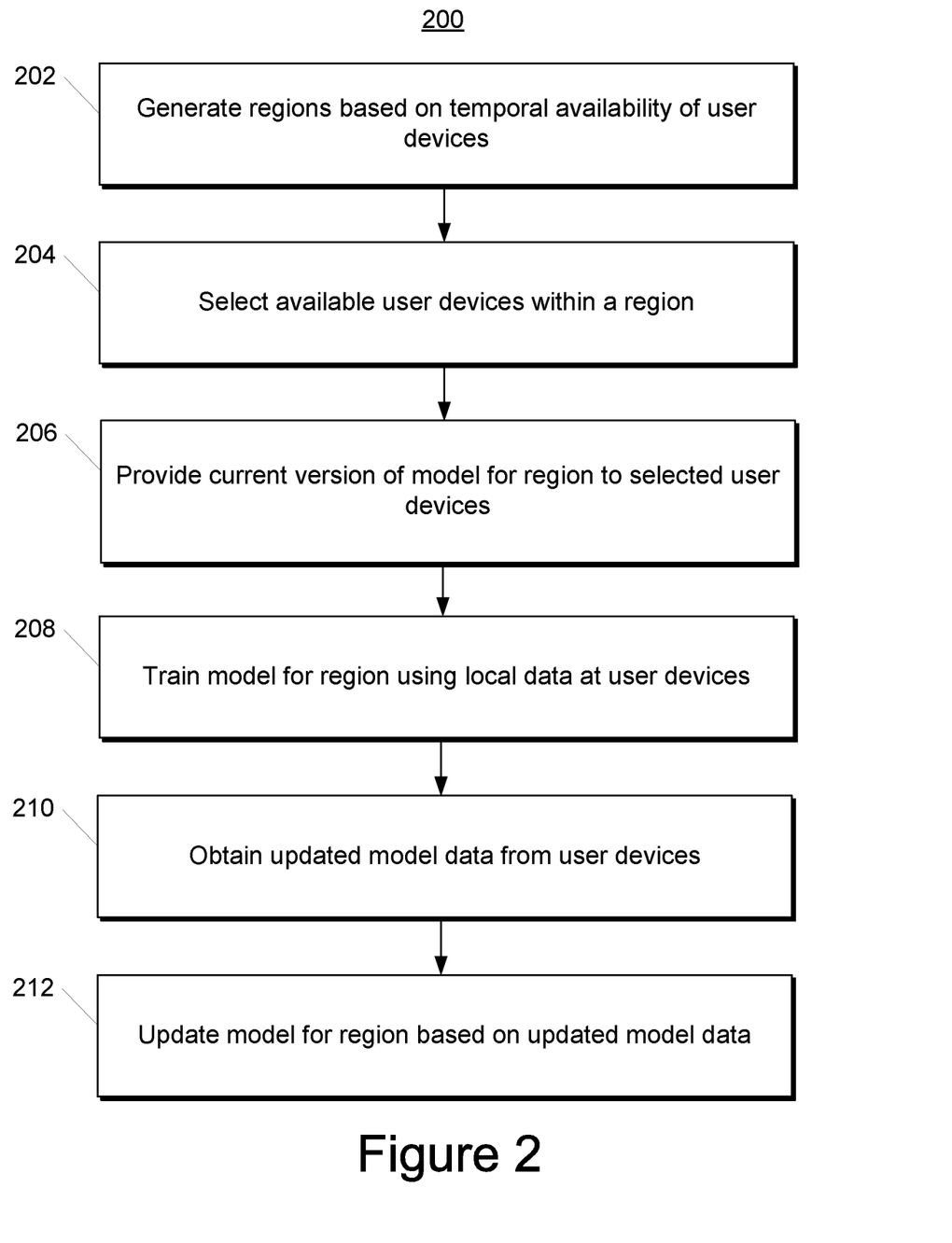
FIG. 2 depicts a flow chart diagram of an example method to perform distributed on-device machine learning model training according to example embodiments of the present disclosure.

FIG. 2 depicts a flowchart diagram of example operations 200 to perform distributed on-device machine learning model training according to example embodiments of the present disclosure. Although FIG. 2 depicts steps performed in a particular order for purposes of illustration and discussion, the methods of the present disclosure are not limited to the particularly illustrated order or arrangement. The various steps of the method 200 can be omitted, rearranged, combined, and/or adapted in various ways without deviating from the scope of the present disclosure.

At 202, a computing system, such as server computing system 130 of FIG. 1, can obtain a plurality of regions based on temporal availability of user devices (e.g., where obtaining a plurality of regions includes generating the regions based on one or more factors). For example, the regions can be generated such the respective user devices located in each region exhibit similar temporal availability patterns. In some implementations, for instance, the world can be subdivided into a plurality of spatial regions such that there is some measure of diurnal cycle uniformity for each of the regions in addition to a large enough user population for each of the regions to provide data availability for training machine-learned models. For example, the world can be subdivided such that each region is large enough to ensure that enough devices (e.g., thousands of devices) can be consistently found online for a period of at least several hours each day and each region is small enough and is determined such that a typical diurnal cycle for users in the region does not vary much within the region.

At 204, the computing system can select a plurality of available user devices within a region, such that the plurality of selected user devices within the region can be tasked with training a machine-learned model.

At 206, the computing system can provide a current version of a machine-learned model associated with the region to the plurality of selected user devices within the region.

At 208, the selected user devices within the region, such as user computing device 102 of FIG. 1, can perform training of the received current version of the machine-learned model associated with the region using data local to each of the plurality of selected user devices. For example, in some implementations, the current version of the machine-learned model associated with the region can be trained at each of the selected user devices within the region using federated learning techniques. For example, each of the devices selected for a training iteration can be tasked with using the locally-generated and locally-stored data on the device to compute an update to the machine-learned model.

At 210, the computing system can obtain updated machine-learned model data from the plurality of selected user devices.

At 212, the computing system can generate an updated machine-learned model associated with the region based on the updated machine-learned model data. For example, in some implementations, the computing system can use multitask learning techniques to bias the machine-learned model learned in one region to be more like one or more of the models being learned in one or more other regions. By combining information across regions, each region's model can be allowed to benefit from the model data generated in all the other regions.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for federated training of machine-learned models based on a plurality of regions, the method comprising:
obtaining, by one or more computing devices, the plurality of regions based at least in part on temporal availability of user devices;
selecting, by the one or more computing devices, a plurality of available user devices within a region;
providing, by the one or more computing devices to the plurality of selected user devices, a current version of a machine-learned model that is trained using federated learning based on the plurality of selected user devices within the region, the current version of the machine-learned model comprising a copy of a global machine-learned model associated with the region;
obtaining, by the one or more computing devices from the plurality of selected user devices, updated machine-learned model data generated by the plurality of selected user devices through federated training of the current version of the machine-learned model using data local to each of the plurality of selected user devices, the data local to each of the plurality of selected user devices comprising data that is locally-generated and locally-stored at each of the plurality of selected user devices, wherein the data local to each of the plurality of selected user devices is used with the current version of the machine-learned model locally at each of the plurality of selected user devices in generating the updated machine-learned model data; and
generating, by the one or more computing devices, an updated machine-learned model associated with the region based on the updated machine-learned model data.

2. The computer-implemented method of claim 1, wherein obtaining, by one or more computing devices, a plurality of regions based at least in part on temporal availability of user devices further comprises generating the plurality of regions based at least in part on one or more of:
time zones,
latitude ranges,
longitude ranges,
semantic boundaries,
user population, or
diurnal availability patterns.

3. The computer-implemented method of claim 2, wherein each region is generated such that each region comprises a user population having a similar diurnal cycle.

4. The computer-implemented method of claim 1, further comprising associating, by the one or more computing devices, the copy of the global machine-learned model with each region wherein the machine-learned model associated with the region is trained using federated learning based on users in the region.

5. The computer-implemented method of claim 1, further comprising:
providing, by the one or more computing devices, a regularization term to the plurality of selected user devices within the region, wherein the regularization term is added to the loss function for training of the current version of the machine-learned model associated with the region, and wherein the regularization term represents a sum of distances, measured in parameter space, of the model associated with the region from at least one model of at least one other region.

6. The computer-implemented method of claim 5, wherein the loss function increases based on the sum of the distances, and wherein the regularization term is weighted based on similar language time zones.

7. The computer-implemented method of claim 5, wherein a weight value for the regularization term increases when the region and the at least one model of at least one other region are in similar language time zones.

8. The computer-implemented method of claim 5, wherein a weight value for the regularization term increases when the region and the at least one model of at least one other region are in adjacent time zones.

9. The computer-implemented method of claim 1, wherein generating, by the one or more computing devices, the updated machine-learned model associated with the region based on the updated machine-learned model data further comprises performing, by the one or more computing devices, multitask learning to bias the machine-learned model associated with the region toward at least one machine-learned model associated with at least one other region.

10. The computer-implemented method of claim 1, further comprising:
computing, by the one or more devices, a centroid of at least one model of at least one other region in parameter space; and
providing, by the one or more computing devices, the centroid to the plurality of selected user devices within the region, wherein each of the plurality of selected user devices computes a distance, measured in parameter space, of the model associated with the region from the centroid as a regularization term that is added to the loss function for training of the current version of the machine-learned model associated with the region.

11. A computing device comprising:
one or more processors; and
one or more non-transitory computer-readable media that store instructions that, when executed by the one or more processors, cause the computing device to:
generate a plurality of regions based at least in part on temporal availability of user devices;
select a plurality of available user devices within a region;
provide, to the plurality of selected user devices, a current version of a machine-learned model that is trained using federated learning based on the plurality of selected user devices within the region, the current version of the machine-learned model comprising a copy of a global machine-learned model associated with the region, wherein each of the plurality of selected user devices performs training of the current version of the machine-learned model associated with the region using data local to each of the plurality of selected user devices the data local to each of the plurality of selected user devices comprising data that is locally-generated and locally-stored at each of the plurality of selected user devices;
obtain, from the plurality of selected user devices, updated machine-learned model data, wherein the data local to each of the plurality of selected user devices is used with the current version of the machine-learned model locally at each of the plurality of selected user devices in generating the updated machine-learned model data; and generate an updated machine-learned model associated with the region based on the updated machine-learned model data.

12. The computing device of claim 11, wherein generating a plurality of regions based at least in part on temporal availability of user devices further comprises generating the plurality of regions based at least in part on one or more of:
time zones,
latitude ranges,
longitude ranges,
semantic boundaries,
user population, or
diurnal availability patterns.

13. The computing device of claim 12, wherein each region is generated such that each region comprises a user population having a similar diurnal cycle.

14. The computing device of claim 11, further comprising instructions that, when executed by the one or more processors, cause the computing device to associate the copy of the global machine-learned model with each region wherein the machine-learned model associated with the region is trained using federated learning based on users in the region.

15. The computing device of claim 11, further comprising instructions that, when executed by the one or more processors, cause the computing device to:
compute a regularization term which represents a sum of distances, measured in parameter space, of the model associated with the region from at least one other model of at least one other region; and
provide the regularization term to the plurality of selected user devices within the region, wherein the regularization term is added to the loss function for training of the current version of the machine-learned model associated with the region.

16. The computing device of claim 11, wherein generating the updated machine-learned model associated with the region based on the updated machine-learned model data further comprises performing multitask learning to bias the machine-learned model associated with the region toward at least one machine-learned model associated with at least one other region.

17. The computing device of claim 11, further comprising instructions that, when executed by the one or more processors, cause the computing device to:
compute a centroid of at least one model of at least one other region in parameter space; and
provide the centroid to the plurality of selected user devices within the region, wherein each of the plurality of selected user devices computes a distance, measured in parameter space, of the model associated with the region from the centroid as a regularization term that is added to the loss function for training of the current version of the machine-learned model associated with the region.

18. A system comprising:
a server; and
a plurality of user devices;
the server comprising:
one or more processors; and
one or more non-transitory computer-readable media that store instructions that, when executed by the one or more processors, cause the one or more processors to perform operations, the operations comprising:
obtaining a plurality of regions based at least in part on temporal availability of user devices;
selecting, from the plurality of user devices, a plurality of available user devices within a region;
providing, to the plurality of selected user devices, a current version of a machine-learned model that is trained using federated learning based on the plurality of selected user devices within the region, the current version of the machine-learned model comprising a copy of a global machine-learned model associated with the region;
obtaining, from the plurality of selected user devices, updated machine-learned model data, wherein data local to each of the plurality of selected user devices is used with the current version of the machine-learned model locally at each of the plurality of selected user devices in generating the updated machine-learned model data; and
generating an updated machine-learned model associated with the region based on the updated machine-learned model data;
each of the plurality of user devices comprising:
one or more processors; and
one or more non-transitory computer-readable media that store instructions that, when executed by the one or more processors, cause the one or more processors to perform operations, the operations comprising:
performing, in response to being selected from the plurality of user devices as an available user device within the region and receiving the current version of a machine-learned model associated with the region, training of the current version of the machine-learned model that is trained using federated learning using data local to the user device, the data local to the user device comprising data that is locally-generated and locally-stored at the user devices; and
providing, to the server, updated machine-learned model data generated through the training of the current version of the machine-learned model.

19. The system of claim 18, wherein obtaining a plurality of regions based at least in part on temporal availability of user devices further comprises generating the plurality of regions based at least in part on one or more of:
time zones,
latitude ranges,
longitude ranges,
semantic boundaries,
user population, or
diurnal availability patterns.

20. The system of claim 18, the server further comprising operations comprising:
computing a regularization term which represents a sum of distances, measured in parameter space, of the model associated with the region from at least one model of at least one other region; and
providing the regularization term to the plurality of selected user devices within the region, wherein the regularization term is added to the loss function for training of the current version of the machine-learned model associated with the region.

21. The system of claim 18, wherein generating the updated machine-learned model associated with the region based on the updated machine-learned model data further comprises performing multitask learning to bias the machine-learned model associated with the region toward at least one machine-learned model associated with at least one other region.

22. The system of claim 18, the server further comprising operations comprising:

computing a centroid of at least one model of at least one other region in parameter space; and providing the centroid to the plurality of selected user devices within the region, wherein each of the plurality of selected user devices computes a distance, measured in parameter space, of the model associated with the region from the centroid as a regularization term that is added to the loss function for training of the current version of the machine-learned model associated with the region.

\* \* \* \* \*